United States Patent [19]

Fujimori et al.

[11] Patent Number: 5,403,687
[45] Date of Patent: Apr. 4, 1995

[54] MODIFICATION OF PIGMENT AND ELECTROPHOTOGRAPHIC PHOTORECEPTOR WITH MODIFIED PIGMENT

[75] Inventors: Mizue Fujimori; Yorinobu Yamada, both of Saitama, Japan

[73] Assignee: Citizen Watch Co., Ltd., Tokyo, Japan

[21] Appl. No.: 71,475

[22] Filed: Jun. 4, 1993

[30] Foreign Application Priority Data

Feb. 5, 1993 [JP] Japan .................. 5-040671
Feb. 19, 1993 [JP] Japan .................. 5-055087

[51] Int. Cl.$^6$ ............................ G03G 5/06
[52] U.S. Cl. ....................... 430/73; 430/135
[58] Field of Search ............. 430/56, 73, 78, 135

[56] References Cited

U.S. PATENT DOCUMENTS

| | | | |
|---|---|---|---|
| 3,672,979 | 6/1972 | Gerace et al. | 430/135 |
| 3,801,591 | 4/1974 | Jackson . | |
| 4,224,222 | 9/1980 | Spietschka et al. . | |
| 4,557,868 | 12/1985 | Page et al. . | |
| 4,615,963 | 10/1986 | Matsumoto et al. | 430/135 X |
| 4,804,417 | 2/1989 | Fujita et al. | 106/498 |
| 4,881,980 | 11/1989 | Dietz et al. | 106/495 |
| 5,153,094 | 10/1992 | Kazmaier et al. | 430/135 |
| 5,168,022 | 12/1992 | Wasmund et al. | 430/135 X |

FOREIGN PATENT DOCUMENTS

| | | |
|---|---|---|
| 0314100 | 5/1989 | European Pat. Off. . |
| 189758 | 9/1985 | Japan .................. 430/135 |
| 201353 | 10/1985 | Japan .................. 430/135 |
| 547411 | 8/1942 | United Kingdom . |
| 600944 | 4/1948 | United Kingdom . |
| 884154 | 12/1961 | United Kingdom . |

Primary Examiner—Roland Martin
Attorney, Agent, or Firm—Flynn, Thiel, Boutell & Tanis

[57] ABSTRACT

A method of modifying a pigment which comprises dissolving the pigment into sulfuric acid and then mixing water with the pigment-sulfuric acid solution. The modified pigment is excellent in achieving uniform dispersion and has a small particle size. An electrophotographic photoreceptor containing the modified pigment as the organic photoconductor has uniform sensitivity, sufficient charge acceptance and small dark decay.

5 Claims, 2 Drawing Sheets

MODIFICATION OF PIGMENT AND ELECTROPHOTOGRAPHIC PHOTORECEPTOR WITH MODIFIED PIGMENT

BACKGROUND OF THE INVENTION

This invention relates to a method of modifying a pigment which is capable of obtaining a fine particle size as well as removing impurities from a crude pigment, and relates to an electrophotographic photoreceptor containing the modified pigment as the organic photoconductor.

Pigments are widely used in paints and for various other uses. The pigments used are not crude pigments as is but are provided with various modifications such as being homogeneously tinted, and having improved gloss, color strength, dispersibility or the like.

Heretofore, the modification of a crude pigment into a dispersible state is conducted by improving the synthesis conditions of the pigment, by a specific treatment after synthesis or the like. As the treatment after synthesis, there is the method of mixing and grinding the crude pigment with an inorganic salt or a grinding assistant, the method of blending a surfactant therewith and subsequent pulverization and so on. Furthermore, in the case of phthalocyanine compounds, there are the acid pasting method, the acid slurry method and so on. For the purification of pigment, the solvent extraction method is, in general, utilized.

Recently, various pigments have been used for photoelectric devices, electrophotographic photoreceptors, photorecording media and the like by utilizing the absorption wavelength of the pigment. The above functional pigments have problems in that their properties change during storage because of impurities and the properties become disproportionate because of uneven particle size, and the like. For example, when a crude pigment is used as the organic photoconductor of an electrophotographic photoreceptor, problems of the inferiority in uniform dispersability and of uneven sensitivity due to the larger particle size of the pigment occur. Moreover, when the pigment contains a large quantity of impurities, there are also problems in initial characteristics, such as a low charge acceptance and a great dark decay, and during repeated use, such as a sensitivity shift, a decrease in charge acceptance or the like occurring. In order to resolve the above problems, the above modifications have been developed, but they are still insufficient.

SUMMARY OF THE INVENTION

An object of the invention is to provide a method of modifying a pigment which ensures uniform dispersion and a small particle size of the pigment.

Another object of the invention is to provide an electrophotographic photoreceptor containing a pigment modified by the above method.

The present invention provides a method of modifying a pigment which has achieved the above object, comprising dissolving the pigment into sulfuric acid, and then mixing water with the pigment-sulfuric acid solution, and an electrophotographic photoreceptor containing the pigment modified by the above method.

1 ... Conductive substrate
2 ... Charge generation layer
3 ... Charge transport layer
4 ... Photosensitive layer

DETAILED DESCRIPTION OF THE INVENTION

The pigments applicable to the modification method of the invention are soluble in but not decomposed by sulfuric acid. As such a pigment, there are phthalocyanine pigments, squarylium pigments, perylene pigments, azo pigments, quinacridone pigments, and the like. Although the above pigments are usable as the organic photoconductor of an electrophotographic photoreceptor, photoconductive squarylium compounds are preferable. Photoconductive squarylium compounds usable in the invention include the compounds having the following formula.

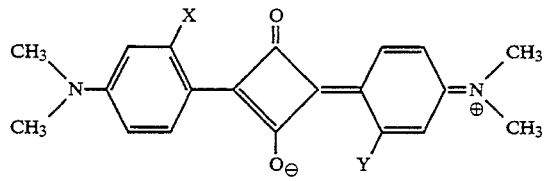

In the formula, X and Y are identical with or different from each other, and represent hydrogen, fluorine, hydroxyl, alkyl, and alkoxy. The numbers of carbon atoms of the alkyl group and alkoxy group are in the range of 1 to 6.

The squarylium compound can be synthesized according to the disclosure in Synthesis. 961 (1980), Angew. Chem. Int. Ed. Engl. 7:530 (1968) or the like.

In the modification method of the pigment, the pigment is dissolved into sulfuric acid. A suitable mixing ratio of the pigment/sulfuric acid is 1/5 to 1/50, preferably 1/10 to 1/20, by weight ratio.

The pigment-sulfuric acid solution may be mixed with a water-soluble organic solvent which is inactive in sulfuric acid, such as water-soluble lower alcohols, glycols, glycol ethers and carboxylic acids. Examples of the organic solvent are methanol, ethanol, propanol, iso-propanol, glycerol, ethylene glycol, triethylene glycol, diethylene glycol monomethyl ether, diethylene glycol monoethyl ether, diethylene glycol dimethyl ether, triethylene glycol diethyl ether, N-methyl-2-pyrrolidone, cellosolve, acetic acid, propionic acid, butyric acid, iso-butyric acid, cyclohexanecarboxylic acid, and the like. A suitable blending ratio of the organic solvent/the pigment sulfuric acid solution is 1/10 to 1/500, preferably 1/30 to 1/100, by weight ratio.

Subsequently, water is added to the pigment-sulfuric acid solution. A suitable amount of water is 5/1 to 500/1, preferably 8/1 to 300/1 as the weight ratio of water/pigment-sulfuric acid solution. For the modification of the pigment, there are the following three methods. The first method comprises dissolving the pigment into sulfuric acid and then mixing the pigment-sulfuric acid solution with water. The second method comprises dissolving the pigment into sulfuric acid, mixing the pigment-sulfuric acid solution with the above water-soluble organic solvent, and then mixing the mixture solution with water. The third method comprises dissolving the pigment into sulfuric acid, and then mixing the pigment-sulfuric acid solution with an aqueous solution of the above water-soluble solvent. The modification condition is preferably at a temperature of −30° to 30° C., preferably −20° to 20° C.

Figure 1:
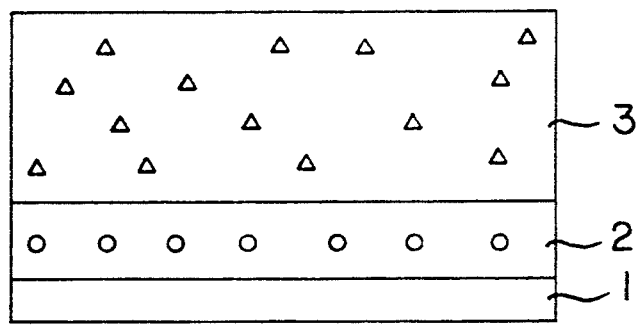
FIGS. 1 through 3 are sectional views of electrophotographic photoreceptors embodying the invention, respectively.
Figure 2:
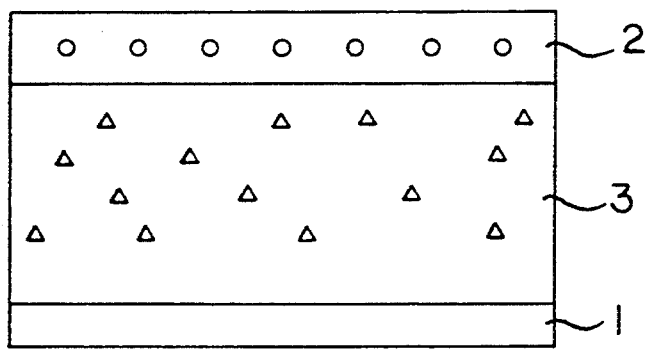
Figure 3:
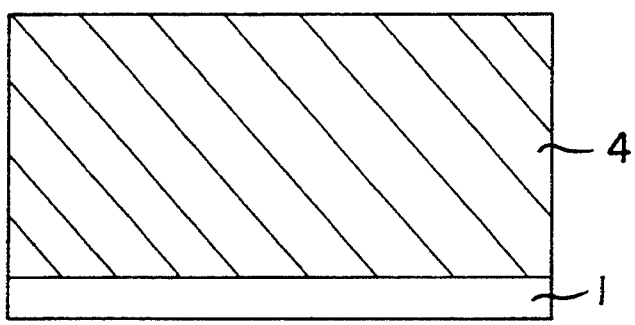

Some embodiments of the electrophotographic photoreceptor of the invention are illustrated in FIGS. 1 through 3.

The electrophotographic photoreceptor of FIG. 1 is prepared by forming a charge generation layer 2 containing a pigment which is the organic photoconductor on a conductive substrate 1 and laminating a charge transport layer 3 thereonto. The charge transport layer 3 is formed of a binder resin in which a charge transport material is dispersed. A small amount of the charge transport material may be added to the charge generation layer 2.

The electrophotographic photoreceptor of FIG. 2 is prepared by forming a charge transport layer 3 on a conductive substrate 1 and laminating a charge generation layer 2 thereonto.

The electrophotographic photoreceptor of FIG. 3 is prepared by forming a photosensitive layer 4 containing a pigment which is the organic photoconductor on a conductive substrate 1.

In the electrophotographic photoreceptor of the invention, the charge generation layer 2 or the photosensitive layer 4 is formed by directly depositing the pigment or applying a binder resin solution wherein the pigment is dispersed onto the conductive substrate 1 or the charge transport layer 3. As the binder resin, there are thermoplastic resins, such as polyester resins, polycarbonate resins and polyvinyl butyral resins, and thermosetting resins having a high volume specific resistance and a high mechanical strength, such as polyurethane resins, epoxy resins, amino resins, melamine resins, formalin resins and phenol resins. A suitable content of the pigment is 10 to 60 wt. %, preferably 20 to 40 wt. %.

The charge transport material and the binder resin used for the charge transport layer 3 may be those used in conventional electrophotographic photoreceptors. Such a charge transport material includes conductive polymers, such as polyvinyl carbazole, and low molecular weight conductive materials, such as hydrazone compounds, styryl compounds and triphenylamine compounds. The binder resin may be anyone having excellent adhesiveness and insulating properties.

The charge transport layer 3 may be prepared by dispersing the charge transport material into the binder resin and applying it onto the conductive substrate 1 or the charge generation layer 2.

Either the charge generation layer 2, the charge transport layer 3 or the photosensitive layers 4 may be blended with a plasticizer for improving plasticity, adhesiveness and mechanical strength, an antioxidant for improving chemical strength to the extent as to not degrade the photosensitive properties of the photoreceptor. The photoreceptor is provided optionally with an intermediate layer for improving the adhesiveness to the conductive substrate 1 or to inhibit the injection of carriers from the conductive substrate 1, a surface-protective layer in order to improve mechanical properties, or the like.

As the coating means of the charge generation layer 2, the charge transport layer 3, the photosensitive layer 4, the intermediate layer and the surface-protective layer, a doctor blade, wire bar, roll coater or the like are, in general, usable.

In the case of the electrophotographic photoreceptors of FIGS. 1 and 2, the thickness of the charge generation layer 2 is less than 5 $\mu$m, preferably 0.1 to 1 $\mu$m, and the thickness of the charge transport layer 3 is 5 to 50 $\mu$m, preferably 10 to 20 $\mu$m. When an intermediate layer or a surface-protective layer is provided, its thickness is preferably less than 1 $\mu$m.

In the case of the electrophotographic photoreceptor of FIG. 3, the thickness of the photosensitive layer 4 is usually 5 to 50 $\mu$m, preferably 10 to 20 $\mu$m. When an intermediate layer or a surface-protective layer is provided, its thickness is preferably less than 1 $\mu$m.

The conductive substrate 1 may be those conventionally used, such as metal substrates, e.g. aluminum, stainless steel, copper or brass, insulating substrates onto which aluminum, indium oxide or the like is deposited, and so on.

According to the modification method of the invention, pigments are obtained which have a very small particle size, are uniform and have excellent dispersibility. When a water-soluble organic solvent which is inactive in sulfuric acid is used, lipophilic impurities as well as hydrophilic impurites can be removed during the modification process. The electrophotographic photoreceptors, wherein the pigment modified by the method of the invention is used as the organic photoconductor, have a high photosensitivity and a small change in properties with the passage of time and by repeated use, and these results indicate that the modified pigment has a high purity.

The pigment modified by the method of the invention has a high photosensitivity and chemical stability and an excellent durability. Thereupon, the electrophotographic photoreceptor of the invention has an excellent charge acceptance and a high sensitivity. Furthermore, since the electrophotographic photoreceptor of the invention has an absorption in a wide wavelength range from the visible to infrared region, it is applicable to laser printers, liquid crystal shutter printers, LED printers, copying apparatuses, computerized type-setting systems, and the like.

EXAMPLES

Example 1

Figure 4:
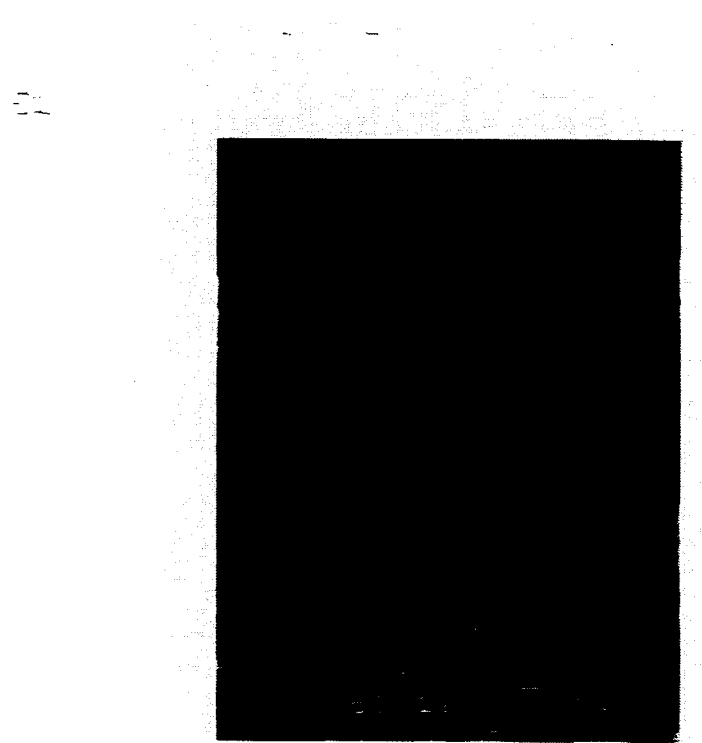
FIG. 4 is an electron microscope photograph of a pigment prior to providing the modification method of the invention.

A squarylium compound having the following formula was synthesized by heating squarylic acid and N,N-dimethylaniline in a solvent mixture of n-butanol and toluene then dehydrated through azeotropic reaction. The suqarylium compound was purified by the solvent extraction method. An electron microscope photograph of the squarylium compound is shown in FIG. 4 at 2,000 magnification.

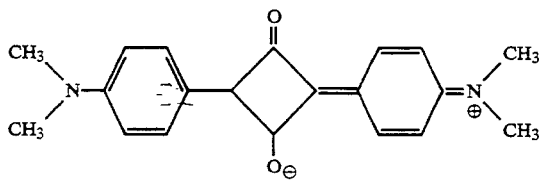

Figure 5:
FIG. 5 is an electron microscope photograph of the pigment after providing the modification method of the invention.

Subsequently, 1 g the squarylium compound was dissolved in 10 g of sulfuric acid, and the pigment-sulfuric acid solution was then added dropwise to 500 g of diethylene Elycol dimethyl ether in an ice bath. Thereafter, 100 g of water was slowly added to the mixture to obtain a modified squarylium compound. An electron microscope photograph of the modified squarylium is shown in FIG. 5 at 20,000 magnification. As can be seen from both photographs, the particle size of the pigment became very fine and the particle size itself became uniform.

Example 2

2 g of the squarylium compound modified in Example 1 was mixed with a polymer solution prepared by dissolving 20 g of polyester resin into 180 g of cyclohexanone and dispersed by a shaking type dispersing machine for 3 hours. The modified squarylium compound had an excellent dispersibility and could easily be dispersed. The solution obtained was applied onto an aluminum deposited polyester film by a wire bar to form a charge generation layer 0.5 μm in dry thickness containing 10 wt. % of the squarylium compound.

10 g of the following hydrazone compound was dissolved as the charge transport material into a polymer solution prepared by dissolving 12 g of polycarbonate resin into 108 g of cyclohexanone.

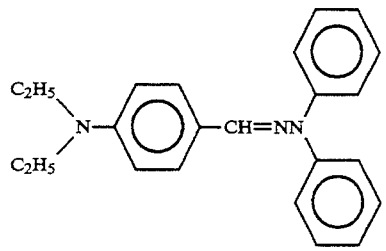

The solution obtained was applied onto the charge generation layer by a wire bar to form a charge transport layer 17 μm in thickness and obtain an electrophotographic photoreceptor.

The electrophotographic photoreceptor thus prepared was charged by corona discharge in −6 kV at a dark place and then exposed to a W lamp at 780 nm at an intensity of illumination of 2.5 μW/cm² for 20 seconds in order to examine the photoreceptor properties. Measured photoreceptor properties were initially charged potential $V_o$ after charging, time $t_D$ necessary for dark-decaying from −620 V to −600 V in surface potential, quantity of exposed light $E_½$ necessary for light-decaying from −600 V to −300 V and residual potential $V_r$ after light irradiation for 20 seconds. Furthermore, similar operations were repeated 1000 times as to the electrophotographic photoreceptor, and $V_o$ (1000), $t_D$ (1000), $E_½$ (1000) and $V_r$ (1000) were measured to evaluate durability. The results are shown in Table 1.

Example 3

A squarylium compound was synthesized by heating squarylic acid and N,N-dimethylaniline in a solvent mixture of n-butanol and toluene, and then dehydrated through azeotropic reaction. Subsequently, 1 g of the squarylium compound was dissolved in 10 g of sulfuric acid and the pigment-sulfuric acid solution was then added dropwise to an aqueous diethylene glycol dimethyl ether solution consisting of 100 g of water and 500 g of diethylene glycol dimethyl ether in an ice bath to obtain a modified squarylium compound. When the modified squarylium compound was observed by an electron microscope, it was found that the particle size was similar to FIG. 5. The modified squarylium compound had an excellent dispersibility and an electrophotographic photoreceptor could be prepared under conditions similar to Example 2. The photoreceptor properties were also similar to Example 2.

Example 4

A squarylium compound was synthesized by heating squarylic acid and N,N-dimethylaniline in a solvent mixture of n-butanol and toluene, and dehydrated through azeotropic reaction. Subsequently, 1 g of the squarylium compound was dissolved in 10 g of sulfuric acid and the pigment-sulfuric acid solution was then added dropwise to 500 g of water to obtain a modified squarylium compound. When the modified suquarylium compound was observed by an electron microscope, it was found that the particle size was similar to FIG. 5. The modified squarylium compound had an excellent dispersibility and an electrophotographic photoreceptor could be prepared under conditions similar to Example 2. The photoreceptor properties were also similar to Example 2.

Example 5

1 g of the following perylene pigment was dissolved in 15 g of sulfuric acid and the pigment-sulfuric acid solution was added dropwise to an aqueous diethylene glycol dimethyl ether solution.

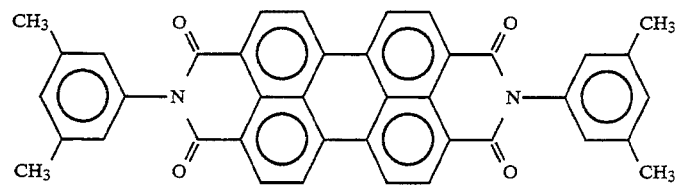

When the modified perylene pigment was observed by an electron microscope, it was found that the particle size became very small and uniform compared with that before modification.

Example 6

5 g of the perylene pigment modified in Example 5 was mixed with a polymer solution prepared by dissolving 20 g of polyester resin into 180 g of cyclohexanone and dispersed by a shaking type dispersing machine for 3 hours. The solution obtained was applied onto an aluminum deposited polyester film by a wire bar to form a photosensitive layer 17 μm in dry thickness.

The electrophotograpic photoreceptor thus prepared was charged by corona discharge at −6 kV in a dark place and then exposed to light at 500 nm at an intensity of illumination of 2.5 μW/cm² for 20 seconds in order to examine the photoreceptor properties. Measured photoreceptor properties were initially charged at potential $V_o$ after charging, time $t_D$ necessary for dark-decaying from −620 V to −600 V in the surface potential, quantity of exposed light $E_{\frac{1}{2}}$ necessary for light-decaying from −600 V to −300 V and residual potential $V_r$ after light irradiation for 20 seconds. Furthermore, similar operations were repeated 1000 times as to the electrophotographic photoreceptor, and $V_o$ (1000), $t_D$ (1000), $E_{\frac{1}{2}}$ (1000) and $V_r$ (1000) were measured to evaluate durability. The results are shown in Table 1.

Example 7

An electrophotographic photoreceptor was prepared under conditions similar to Example 2, except that the following compound was used as the charge transport material. The photoreceptor properties are shown in Table 1.

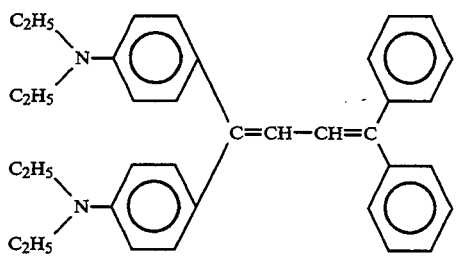

Example 8

An electrophotographic photoreceptor was prepared under conditions similar to Example 2, except that the squarylium compound concentration of the charge generation layer was changed to 5 wt. %. The photoreceptor properties are shown in Table 1.

TABLE 1

| Photoreceptor Properties | Example 2 | Example 6 | Example 7 | Example 8 |
|---|---|---|---|---|
| $V_o$ [V] | −732 | −762 | −741 | −791 |
| $t_D$ [sec] | 12 | 18 | 13 | 16 |
| $E_{\frac{1}{2}}$ [μJ/cm²] | 0.46 | 9.89 | 0.45 | 0.83 |
| $V_r$ [V] | −47 | −57 | −43 | −49 |
| $V_o$(1000) [V] | −728 | −758 | −738 | −789 |
| $t_D$(1000) [sec] | 10 | 17 | 11 | 15 |
| $E_{\frac{1}{2}}$(1000)[μJ/cm²] | 0.42 | 9.43 | 0.44 | 0.80 |
| $V_r$(1000) [V] | −50 | −69 | −47 | −52 |

Comparative Example 1

An electrophotographic photoreceptor was prepared under conditions similar to Example 2, except that the squarylium compound was obtained by not dissolving the compound into sulfuric acid and thereafter used as the organic photoconductor. The photoreceptor proerties was shown in Table 2.

Comparative Example 2

An electrophotographic photoreceptor was prepared under conditions similar to Example 6, except that the perylene pigment used in Example 6 was used as the organic photoconductor without providing the modification method of the invention. The photoreceptor properties are shown in Table 2.

Comparative Example 3

An electrophotographic photoreceptor was prepared under conditions similar to Example 2, except that the squarylium compound used in Comparative Example 1 was used and the squarylium compound concentration of the charge generation layer was changed to 5 wt. %. The photoreceptor properties are shown in Table 2.

TABLE 2

| Photoreceptor Properties | Comparative Example 1 | Comparative Example 2 | Comparative Example 3 |
|---|---|---|---|
| $V_o$ [V] | −727 | −746 | −773 |
| $t_D$ [sec] | 10 | 15 | 12 |
| $E_{\frac{1}{2}}$ [μJ/cm²] | 0.73 | 21.47 | 1.28 |
| $V_r$ [V] | −51 | −232 | −59 |
| $V_o$(1000) [V] | −715 | −658 | −761 |
| $t_D$(1000) [sec] | 8 | 13 | 10 |
| $E_{\frac{1}{2}}$(1000)[μJ/cm²] | 0.68 | 18.26 | 1.06 |
| $V_r$(1000) [V] | −56 | −248 | −64 |

We claim:

1. An electrophotographic photoreceptor comprising a modified photoconductive squarylium pigment of the following formula:

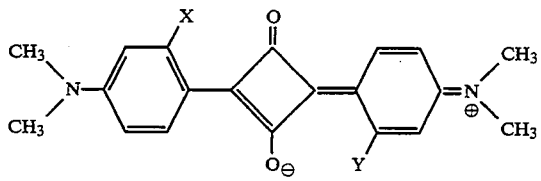

wherein X and Y are the same or different from each other and each represents hydrogen, fluorine, hydroxyl, alkyl having 1–6 carbon atoms or alkoxy having 1–6 carbon atoms, said modified photoconductive squarylium pigment being obtained by dissolving a pigment of the above formula into sulfuric acid to obtain a pigment-sulfuric acid solution, mixing water and a water-soluble solvent which is inactive in sulfuric acid with the pigment-sulfuric acid solution and recovering the modified photoconductive squarylium pigment.

2. The electrophotographic photoreceptor of claim 1, wherein X and Y are hydrogen.

3. The electrophotographic photoreceptor of claim 1, wherein the weight ratio of pigment to sulfuric acid in the pigment-sulfuric acid solution is 1:5 to 1:50, the weight ratio of pigment-sulfuric acid solution to organic solvent is 1:10 to 1:500 and the weight ratio of water to pigment-sulfuric acid solution is 5:1 to 500:1.

4. The electrophotographic photoreceptor of claim 1, wherein said pigment-sulfuric acid solution is mixed with the water-soluble organic solvent prior to the water.

5. The electrophotographic photoreceptor of claim 1, wherein the water has been mixed with the water-soluble organic solvent prior to being mixed with the pigment-sulfuric acid solution.

* * * * *